Dec. 10, 1940.  L. H. STEIN  2,224,704
ANTIFRICTION BEARING
Filed June 17, 1938   2 Sheets-Sheet 1

INVENTOR
Louis H. Stein
BY
ATTORNEY

Dec. 10, 1940.  L. H. STEIN  2,224,704
ANTIFRICTION BEARING
Filed June 17, 1938   2 Sheets-Sheet 2

INVENTOR
Louis H. Stein
BY
John V. Ozars
ATTORNEY

Patented Dec. 10, 1940

2,224,704

UNITED STATES PATENT OFFICE 2,224,704

ANTIFRICTION BEARING

Louis H. Stein, Chicago, Ill., assignor to Aetna Ball Bearing Mfg. Co., Chicago, Ill., a corporation of Illinois Application June 17, 1938, Serial No. 214,216

16 Claims. (Cl. 308—233)

My invention relates to antifriction bearings and more particularly to new and useful improvements therein. Although not limited in its field of application, nor to the kind of bearing elements employed, I have illustrated the invention with especial reference to thrust bearings and have shown balls rather than rollers as the antifriction element, but it will be apparent to those skilled in the art that the application and form of the invention are adaptable to any environment and may be carried out with either roller or ball bearings.

In United States Patent Number 1,958,725, which issued May 15, 1934, from an application filed August 14, 1933, I have shown a thrust bearing which is typical of those utilized in the clutch release mechanism of motor cars. In such bearings the axis of rotation lies in a horizontal plane so that the weight of the bearing elements tends to displace the latter from concentricity with the grooves in the race ring faces, and the speed of rotation is such as to throw the lubricant outwardly from the bearing path to the internal walls of the bearing housing. In the construction of my beforementioned invention, a satisfactory but relatively expensive method of insuring concentricity of balls and race grooves was resorted to, and the compactness of the housing, coupled with a special oil impregnated alloy from which the ball retainer ring was formed, maintained the balls in lubricated condition. As is evident in the drawings of that patent, one of the race rings has a drive fit on the floating carrier or sleeve, whereas, the second race ring is journaled on the ball retainer ring which in turn is provided with a running fit on the floating sleeve.

One object of my present invention is to simplify the structural relationship of the parts of such a bearing, and effect this result by providing one race ring with a hub or collar adapted to drivingly fit the floating carrier or sleeve and to additionally journal the second race ring and ball retainer ring. Thus a unitary assembly is obtained in which the concentricity of the bearing balls and race rings is related to a single element of the structure, that is, the collar on the one race. Hence manufacturing difficulties are reduced and the possibility of excentricity arising in the operation of the bearing is minimized.

Yet another object of the invention is the provision of means to continuously recirculate lubricant which has been thrown outwardly to the walls of the bearing housing, back to the bearing path.

Still another object of my invention is the provision of a thrust bearing construction comprising a unit, one element of which functions to orient both race rings and the ball retainer.

A further object resides in the provision of a bearing construction which is economical to manufacture, readily assembled, silent in operation, and inherently self-lubricating.

Other objects, advantages and features of my invention will be apparent from the following description of a preferred embodiment thereof which is illustrated in the accompanying drawings in which.

Figure 1:
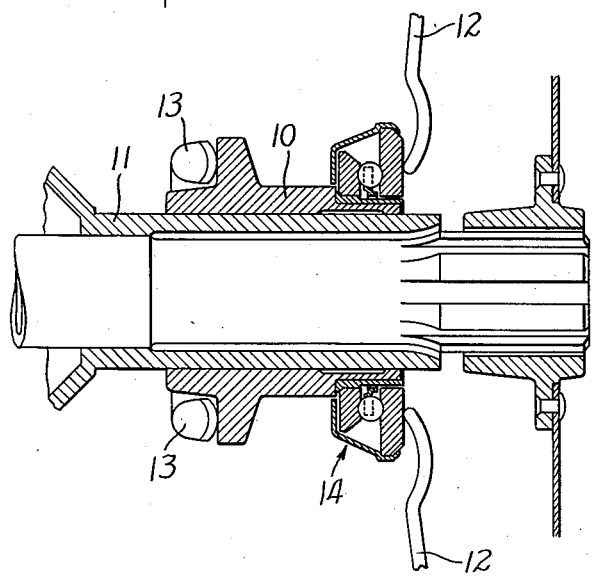
Figure 1 is a vertical longitudinal cross section of a typical automotive clutch release bearing with the invention applied thereto.

Referring now to Figure 1, the clutch release mechanism comprises essentially a floating carrier or sleeve 10 arranged to slide on a stationary tubular support or quill 11. The sleeve 10 is urged in a leftward direction as viewed in Figure 1, by spring actuated clutch release fingers 12, and a pedally operated yoke 13 moves the sleeve to the right against the action of fingers 12.

The thrust bearing, generally indicated at 14, is interposed between the release fingers 12 and the floating carrier 10 to eliminate the excessive wear which would otherwise occur between the release fingers and carrier when the fingers are caused to rotate.

Figure 2:
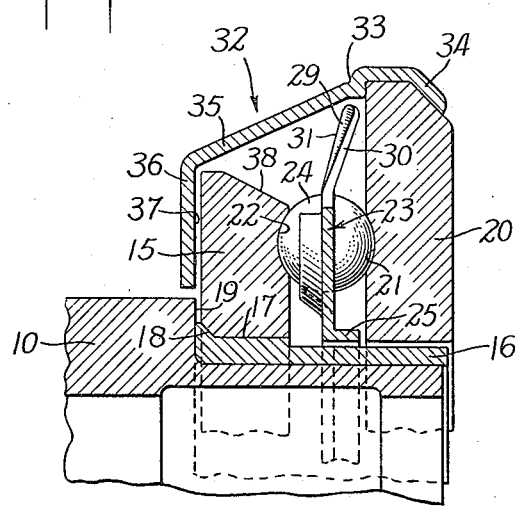
Figure 2 is an enlarged fragmentary section of part of the bearing shown in Figure 1.

As shown in enlarged fragmentary cross-section in Figure 2, the bearing 14 comprises a race ring 15 tightly pressed on a bushing or hub 16, which in turn is forced upon the bearing carrier or sleeve 10. Race ring 15 is desirably hardened to resist wearing action, and to prevent bearing contact of similar metals, the bushing 16 is preferably made of bronze or other antifriction material. As shown in the drawings, bushing 16 is desirably formed with an enlarged end portion 17 which extends throughout the axial thickness of ring 15 to insure rigidity of the ring and bushing assembly. The portion 17 of the bushing terminates at its left end in a beveled peripheral flange 18 which abuts a shoulder 19 on carrier 10 and functions at the same time to effectively prevent displacement of ring 15 from the bushing under the influence of thrust loads imparted either by yoke 13 or release fingers 12.

A free race ring 20 is journaled on the bushing 16 and is formed with a race groove 21 which is concentric with a corresponding groove 22 in the fixed race 15. A retainer ring 23, journaled on the bushing 16 between the fixed race 15 and free race 20 serves to support a plurality of ball bearings 24 through which thrust loads communicated to the free ring 20 are imparted to the fixed ring 15.

Figure 3:
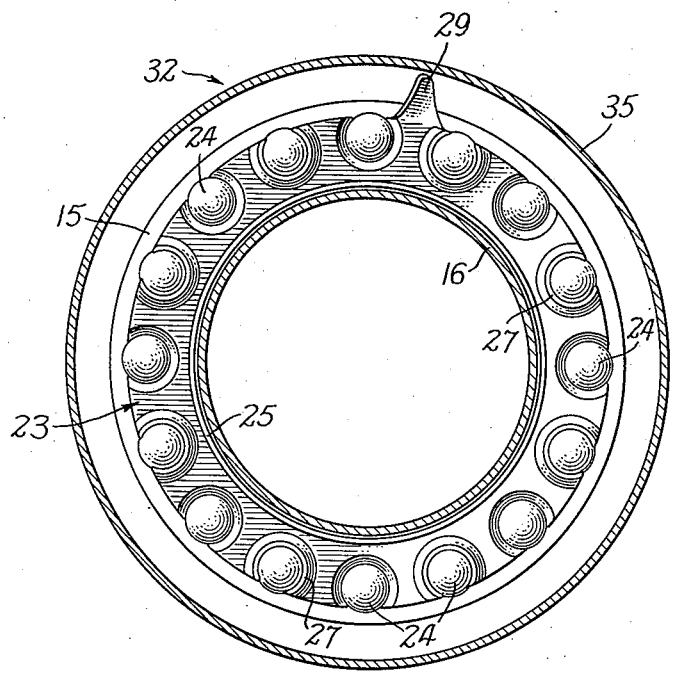
Figure 3 is an enlarged plan view of a novel form of bearing retainer ring employed in connection with my present invention.
Figure 4:
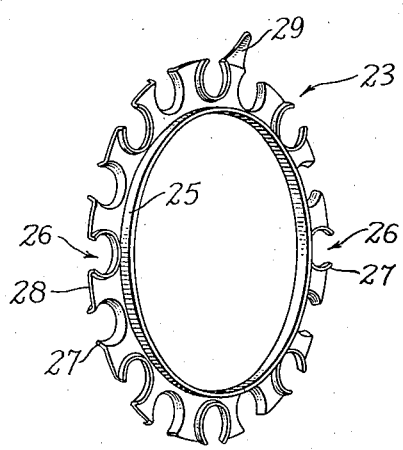
Figure 4 is a perspective view of the retainer ring shown in Figure 3.

Referring additionally to Figures 3 and 4, the retainer ring 23 is stamped from a plate to provide a hub portion 25 which journals upon the bushing 16, and a plurality of equally spaced, concentrically arranged pockets or guides 26 which support the ball bearings 24 against radial displacement. The pockets 26 consist of segmental arcuate surfaces 27, alternate ones of which extend outwardly from the opposite faces of the ring to lend rigidity to the structure and facilitate the assembling operation. The hub 25 of ring 23 is journaled on bushing 16 with sufficient accuracy to maintain the balls 24 in accurate concentricity with the grooves of the race rings whether the bearing be under thrust load or running free.

In my beforementioned Patent Number 1,958,725, the retainer ring was formed with closed ball pockets, that is, the material of the ring defined a closed circle on a diameter of each of the balls, whereas, in the present construction, it will be seen that the ball pockets open to the peripheral edge 28 of the retainer ring to allow free circulation of lubricant.

As shown in Figures 2, 3 and 4, the retainer ring is formed with a blade or circulating lug 29 which projects externally of the circular row of ball pockets 26, its upper end being turned to the right as viewed in Figure 2, toward the inner face of race ring 20. Furthermore, the surface of the lug is inclined, rather than parallel, to the inner face of ring 20, the direction of inclination being determined by the direction of rotation of the bearing. Thus as shown in Figure 2, the retainer is arranged to rotate away from the observer so that the trailing edge 30 of the circulating lug is closer to the face of race ring 20 than is its leading edge 31.

The bearing is maintained in assembled relationship by a housing or shell 32 which is crimped at 33 and 34 to the peripheral edge of free ring 20 and extends leftwardly and inwardly to enclose the peripheral edge of fixed ring 15. The housing comprises a frusto conical section 35, terminating in a radially inwardly turned portion 36 which is parallel to, and spaced from, the outer face of race ring 15 to define a bearing surface 37.

In my co-pending application, Serial No. 175,779, filed November 22, 1937, I have shown a bearing construction embodying a housing functionally related to the housing shown herein and reference may be made to that application for a complete explanation of the lubricant recirculating properties of the housing construction of this disclosure. Briefly stated, in that invention, rotation of the free race ring causes lubricant in proximity to the race grooves and balls to be thrown radially outwardly to the inner surface of the housing, the action eventually serving to crowd the lubricant leftwardly as viewed in Figure 2 to the inclined peripheral edge 38 of fixed ring 15 and thence back to the path of the balls 24.

In my present invention the blade 29 functions to positively induce a reverse flow of lubricant from the section of the housing of greatest diameter directly back to the path of the ball bearings. More particularly, the inclined surface of the blade impels a radially inward movement of lubricant along the inner face of free race ring 20, thus counteracting the normal centrifugalizing effect of the bearing when the latter is operating.

It will be seen that I have provided a unitary construction which is economical of manufacture, insures concentricity of bearing balls and race grooves independently of the mounting of the bearing and in which, lubricant thrown outwardly in the course of operation, will be positively recirculated to the race grooves and balls.

I claim as my invention:

1. An antifriction bearing comprising, in combination, a shaft, a first race ring tight on said shaft, a hub on said first race ring, a second race ring journalled on said hub in spaced relation from said first race ring, concentric race grooves in the inner faces of said race rings, a ball retainer ring journalled on said hub intermediate said race rings, an annular row of spaced balls embraced by said retainer concentrically with said race grooves, a housing shell providing a closure between the peripheries of said races and means carried by said retainer ring to recirculate lubricant thrown radially outwardly from said balls to said housing.

2. In an antifriction bearing, the combination of a first race ring arranged to rotate, a second race ring adapted to remain stationary while said first ring revolves, spaced antifriction elements interposed between said races, a housing shell fixed with respect to said rotatable ring and extending inwardly around said stationary race ring to define a frusto-conical surface and means operatively supported internally of said housing for movement relative thereto to induce lubricant thrown outwardly from said antifriction elements to return to the path thereof.

3. In an antifriction bearing, the combination of a rotatable race ring, a stationary race ring, a retainer ring interposed between said race rings, bearings supported in said retainer ring, a housing fixed with respect to said rotatable race ring and forming a closure between the peripheries of both race rings, and a part on said retainer, within said housing, and radially external of said bearings, to sweep lubricant from the inner wall of said housing back to the path of said bearings.

4. In an antifriction bearing the combination of a non-rotatable race ring, a rotatable race ring of greater external diameter than said non-rotatable race ring, a bearing retainer interposed between said race rings, bearings carried in said retainer, a housing forming a closure between the peripheries of said races and defining a frusto-conical surface therebetween, and a part carried on said retainer for rotation in a path radially external of the path of said bearings, and between the latter and said housing, to force lubricant thrown from said bearings to recirculate thereto.

5. In an antifriction bearing, the combination of a pair of relatively rotatable race rings of different external diameter, a bearing retainer ring, a circular row of bearings carried by said retainer ring between said race rings, a housing shell of frusto-conical section extending from the periphery of the race ring of lesser diameter to the periphery of the race ring of greater diameter, and means on said retainer ring in the plane of greatest diameter of said frusto-conical housing effective to recirculate lubricant thrown radially outwardly from said bearings.

6. In an antifriction bearing including a pair of spaced race rings and ball bearings therebetween, the combination of a ball retainer ring comprising a circular plate formed with a circular row of ball pockets communicating with the peripheral edge of said plate, alternate pockets being stamped from opposite sides thereof, a bearing surface formed concentrically of the axis of said pockets by turning the edge of a central aperture normally to the plane of the plate, and a tongue on the peripheral edge of the plate externally of said row of ball pockets and turned at an angle to the plane thereof to cause rotation of the retainer to impart an inward movement to lubricant thrown outwardly beyond the path of said bearings.

7. In an antifriction bearing of the character described, the combination of a race ring, a hub fixed with respect to said race ring, a second race ring journalled on said hub, a ball retainer ring journalled on said hub intermediate said race rings, balls rotatively supported in said retainer, a housing fixed with respect to said second mentioned race ring and extending over the periphery of said first race ring and then radially inwardly to define a bearing surface adapted to coact with the first mentioned race ring to maintain said race rings, retainer ring, and balls, in assembled relationship, and means movable relative to said housing in a path radially external of said balls to recirculate lubricant thrown outwardly from the latter.

8. In an antifriction bearing of the character described, the combination of a hub of bearing material, a peripheral flange at one end of said hub, a race ring tightly engaging the periphery of said hub, said race ring being formed with a recess adapted to receive the flange on said hub, a second race ring arranged to be journalled on said hub in spaced relation from said first mentioned race ring, a ball retainer ring, bearing balls carried in said retainer ring, a bearing flange on said retainer ring arranged to be journalled on said hub intermediate said race rings, a housing fixed with respect to one of said race rings and operative to maintain said race rings and ball retainer in assembled relationship on said hub, and means on said retainer ring adapted to move in a circular path radially external of the path of said bearing balls to recirculate lubricant thrown outwardly from the latter.

9. In an antifriction bearing of the character described, the combination of a race ring, a hub fixed with respect to said race ring, a second race ring journalled on said hub, a ball retainer ring journalled on said hub intermediate said race rings, balls rotatively supported in said retainer, a housing fixed with respect to one of said second-mentioned race ring and extending over the periphery of the other and then radially inward to define a bearing surface adapted to coact with said one race ring to maintain said race rings, retainer ring, and balls in assembled relationship, and a part on said retainer ring, radially external of said balls and arranged for rotary movement relative to said housing, said part having a surface inclined to its plane of movement to induce a recirculation of lubricant thrown outwardly from said balls.

10. In an antifriction bearing of the character described, the combination of a race ring, a hub fixed with respect to said race ring, a second race ring journalled on said hub, a ball retainer ring journalled on said hub intermediate said race rings, a circular row of ball pockets formed in said retainer ring, said pockets defining segmental spherical surfaces opening into the peripheral edge of the ring, balls rotatively supported in said pockets, a housing fixed with respect to said second mentioned race ring and extending over the periphery of said first race ring and then radially inwardly to define a bearing surface adapted to coact with the first mentioned race ring to maintain said race rings, retainer ring, and balls in assembled relationship and means carried on said retainer ring to induce a flow of lubricant inwardly from said housing to the path of said balls.

11. In an antifriction bearing of the character described, the combination of a pair of spaced race rings, a hub to carry said rings, a ball retainer ring journalled on said hub intermediate said race rings, balls in said retainer ring, a housing of frusto-conical contour forming a closure between the peripheries of said race rings, and means movable with respect to said housing in the plane of its greatest diameter to induce an inward flow of lubricant from the housing to the balls.

12. In a thrust bearing of the character described, the combination of a non-rotatable race ring, a second race ring of relatively greater diameter journalled on said first race ring for rotation concentrically thereof, a ball retainer ring and bearing balls intermediate said first and second rings, and a frusto-conical housing fixed with respect to said rotatable race ring and embracing both race rings to form a lubricating re-circulating closure therebetween.

13. In a thrust bearing of the character described, the combination of one race ring adapted to non-rotatably engage a shaft, a ball retainer ring, and a second race ring of relatively greater diameter than said first race ring journalled on said first race ring for rotation concentrically thereof, and a frusto-conical housing fixed with respect to said rotatable race ring and forming a lubricant retaining closure around the peripheries of both race rings.

14. In a thrust bearing of the character described, the combination of a non-rotatable race ring, a rotatable race ring of greater external diameter than said first mentioned race ring journalled on said first ring for rotation concentrically thereof, balls intermediate said race rings, and a frusto-conical housing fixed with respect to said second ring and forming a closure between the peripheries of both rings.

15. In a thrust bearing of the character described, the combination of a relatively stationary race ring, a second race ring journalled on said first race ring for rotation relative thereto, a ball retainer ring and balls intermediate said race rings and rotatable with respect to each, and a housing of frusto-conical contour fixed with respect to said second race ring and forming a closure between the peripheries of both race rings.

16. In an antifriction bearing of the class described, the combination of a non-rotatable race ring, a hub on said non-rotatable race ring, a rotatable race ring journalled on said hub, a ball retainer ring journalled on said hub intermediate said race rings, and a frusto-conical housing fixed with respect to said rotatable race ring and extending over the periphery of said first race ring to form a closure between the peripheries of both rings and to maintain the bearing in assembled relationship.

LOUIS H. STEIN.